United States Patent
Huang et al.

(10) Patent No.: US 7,630,415 B2
(45) Date of Patent: Dec. 8, 2009

(54) MICRO CRYSTAL FIBER LASERS AND METHOD OF MAKING FREQUENCY-DOUBLING CRYSTAL FIBERS

(75) Inventors: Sheng-Lung Huang, Hsinchu (TW);
Chia-Yao Lo, Hsinchu (TW);
Sheng-Pan Huang, Hsinchu (TW);
Sun-Bin Yin, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 469 days.

(21) Appl. No.: 10/976,838

(22) Filed: Nov. 1, 2004

(65) Prior Publication Data
US 2006/0002433 A1    Jan. 5, 2006

(30) Foreign Application Priority Data
Jun. 30, 2004    (TW) ................ 93119817 A

(51) Int. Cl.
*H01S 3/30*    (2006.01)
*H01S 3/10*    (2006.01)
*G02B 6/00*    (2006.01)

(52) U.S. Cl. .............. 372/6; 372/22; 385/11
(58) Field of Classification Search ........... 372/6, 372/22; 385/11
See application file for complete search history.

(56) References Cited

U.S. PATENT DOCUMENTS

| | | | | |
|---|---|---|---|---|
| 5,037,181 A | * | 8/1991 | Byer et al. | 385/144 |
| 5,039,456 A | * | 8/1991 | Bowen et al. | 264/1.25 |
| 5,062,117 A | * | 10/1991 | Anthon et al. | 372/75 |
| 5,123,026 A | * | 6/1992 | Fan et al. | 372/75 |
| 5,420,876 A | * | 5/1995 | Lussier et al. | 372/22 |
| 5,740,190 A | * | 4/1998 | Moulton | 372/23 |
| 5,909,306 A | * | 6/1999 | Goldberg et al. | 359/337.1 |

* cited by examiner

*Primary Examiner*—Minsun Harvey
*Assistant Examiner*—Patrick Stafford
(74) *Attorney, Agent, or Firm*—Harness, Dickey & Pierce, P.L.C.

(57) ABSTRACT

A method of fabricating micro crystal fiber lasers and frequency-doubling crystal fibers is disclosed. The micro crystal fiber laser contains gain crystal fibers, frequency-doubling crystal fibers, and a semiconductor laser. The semiconductor laser provides a laser beam. The gain crystal fibers receive the laser beam and generate a base-frequency beam. The frequency-doubling crystal fibers have a polarization alternating period. The frequency-doubling crystal fibers are coupled to the gain crystal fibers to double the frequency of the base-frequency beam and provide a double-frequency beam with the required wavelength. In addition to providing a monochromic crystal fiber laser, the crystal fiber lasers in red, green, and blue light may be combined into an array, providing a color laser. The frequency-doubling crystal fiber can be formed using the LHPG method. During the production process, a polarization alternating external field is continuously imposed on the frequency-doubling crystal fiber, resulting in a polarization alternating period.

23 Claims, 2 Drawing Sheets

MICRO CRYSTAL FIBER LASERS AND METHOD OF MAKING FREQUENCY-DOUBLING CRYSTAL FIBERS

BACKGROUND OF THE INVENTION

1. Field of Invention

The invention relates to a micro crystal fiber laser and, in particular, to a micro crystal fiber laser for color lasers, a micro crystal fiber laser array, and a method of fabricating a frequency-doubling crystal fiber.

2. Related Art

Laser beams are characteristic in their high power density, highly monochromic color, high orientability, and high correlation. Therefore, they are widely used in various fields such as medical therapy, communications, information technology, and industries. Among the laser devices for generating laser beams, semiconductor lasers have the advantages of small volumes, long life cycles, cheap prices, and being suitable for mass production, in comparison with other types of laser devices (e.g. gas lasers and solid state lasers). Thus, they can be commercialized. However, in the three primitive colors (red, green, and blue) of visible light, only red semiconductor lasers can be made commercially popular. Semiconductor lasers in the blue and green bands are restricted by the problems of high prices, difficult production processes, and low light emission rate of wide energy gap semiconductor materials. Therefore, their commercialization still requires further researches and improvement.

As a result, diode-pumped solid state lasers (DPSSL) have been developed. They use semiconductor lasers whose central wavelength is in the absorption spectrum of solid state laser crystals as the stimulating light source of solid state lasers. The stimulated light is usually high power infrared light (wavelength being mostly 800 or 880 nm). The base frequency laser beam emitted by the DPSSL (infrared light with a wavelength of about 1 µm) is doubled in its frequency by the nonlinear crystal inside the resonance cavity, generating the required frequency-doubling laser beam. The DPSSL formed using this method has a better beam output mode, wide wavelength ranges, and large peak values or average power. Therefore, it is an ideal light source. However, the solid state laser crystal used as the gain medium and frequency-doubling crystal in the DPSSL is mostly an insulating material. Its thermal conductivity is worse than metals. In the horizontal excitation modes, the heat dissipation problem is especially serious, affecting the laser output efficiency. To solve this problem, a large heat dissipation system is often required. Moreover, the growth of the solid state laser crystal is very time-consuming, inevitably increasing the device price. Consequently, the current development of DPSSL is seriously restricted by the cost and heat dissipation.

SUMMARY OF THE INVENTION

In view of the foregoing, an objective of the invention is to provide a micro crystal fiber laser and a method of making a frequency-doubling crystal fiber. The micro crystal fiber laser includes gain crystal fibers, frequency-doubling crystal fibers, and a semiconductor laser, using crystal fibers to replace the gain medium and frequency-doubling crystal to save the solid state laser crystal. The high specific surface area of the crystal fiber also avoids the heat dissipation problem.

The micro crystal fiber laser includes a semiconductor laser, gain crystal fibers, and frequency-doubling crystal fibers. The semiconductor laser provides stimulated light. The gain crystal fibers receive the stimulated light and generate base-frequency light. The frequency-doubling crystal fibers have a polarization alternating period, coupled to the gain crystal fibers to double the base-frequency light into the required double-frequency beam. In particular, the gain crystal fiber can be coated with optical films on both sides to form a fiber laser. Alternatively, it can be combined with a frequency-doubling crystal fiber and coated with films to form an intracavity frequency doubling laser. In addition to providing a monochromic crystal fiber laser, the invention can further combine crystal fiber lasers in red, green, and blue light into an array, providing a color laser with a full color mode.

The invention further discloses a method of making the frequency-doubling crystal fiber with a polarization alternating period. There are many methods of growing crystal fibers. In particular, not only can the laser-heated pedestal growth (LHPG) method readily grow single crystals with extremely small diameters, it has a fast growth speed, low power consumption, and easy control without any pollution problem. The disclosed method employs the LHPG method to form a crystal fiber. The steps include: providing a source rod as the ingredient of the crystal fiber; converging a laser beam on the source rod to form a melting region; holding one end of the seed rod and pulling it toward one fixed direction in order to form a thin crystal fiber from the melting region of the source rod; and providing a pair of electrodes on both sides of the crystal fiber. The electrodes continuously alternate their polarizations according to an external electric field. According to the pulling speed of the seed rod, a polarization alternating period is produced to form a polarization alternating period on the crystal fiber. Moreover, an appropriate material can be used to cover the fiber for reducing the transmission consumption. The required crystal fiber is formed by further lapping, polishing, and coating.

The cross section of the solid state laser crystal used in the conventional DPSSL is about 10 mm$^2$. In practice, the excited area of the solid laser crystal is only hundreds of squared micrometers (µm$^2$). The invention makes a crystal fiber several hundred micrometers in diameter. The material used in the solid state laser crystal can be greatly reduced. At the same time, the heat conduction path inside the disclosed crystal fiber is much shorter than that inside the conventional laser crystal. The heat dissipation efficiency of the invention is thus better.

BRIEF DESCRIPTION OF THE DRAWINGS

The invention will become more fully understood from the detailed description given hereinbelow illustration only, and thus are not limitative of the present invention, and wherein.

DETAILED DESCRIPTION OF THE INVENTION

Figure 1:
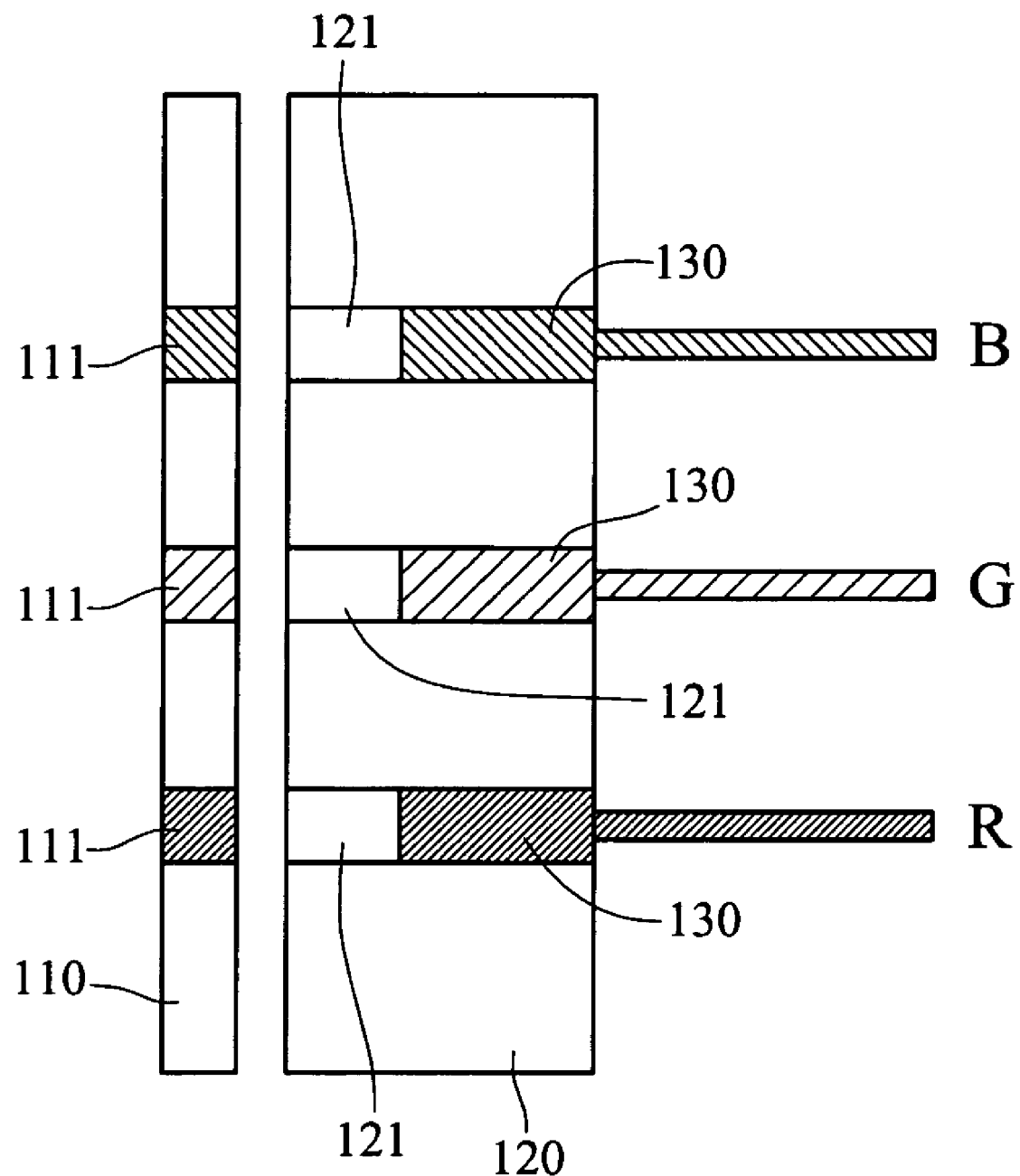
FIG. 1 is a schematic view of the disclosed micro crystal fiber laser array.

The disclosed micro crystal fiber laser can be used to make lasers in red, green, and blue colors. The lasers of different colors can be combined into an array to provide a full-color laser. As shown in FIG. 1, the micro crystal fiber laser array according to an embodiment of the invention includes a semiconductor laser array 110, three gain crystal fibers 121, and three frequency-doubling crystal fibers 130. The semiconductor laser array 110 consists of three semiconductor lasers 111 to provide stimulated light. The gain crystal fibers 121 are aligned with and coupled to the frequency-doubling crystal fibers 130 and are installed on a fixing base 120. Each of the gain crystal fibers 121 is used to receive the stimulated light and generate base-frequency light. Each of the frequency-doubling crystal fibers 130 has a polarization alternating period. The frequency-doubling crystal fibers 130 are respectively coupled to the gain crystal fibers 121. Different polarization alternating periods double the base-frequency light into red, green, and blue double-frequency light.

In the development of full-color lasers, one can use solid state laser materials with multiple primary radiation wavelengths to form gain crystal fibers, which can produce red, green and blue laser light after frequency doubling. The solid state laser material used as the gain medium includes two parts: the active ion and the host. The active ion is the primary working substance for providing necessary energy gaps that produce different laser wavelengths. The host provides appropriate cation-sites for doping active ions. Yttrium aluminum garnet (YAG) and yttrium orthovanadate ($YVO_4$) are used as the host of the laser gain medium. Both Nd:YAG and Nd:$YVO_4$ that use neodymium as the active ions have three major radiation wavelengths. Nd:YAG has the wavelengths of 946 nm, 1064 nm, and 1319 nm. Nd:$YVO_4$ has the wavelengths of 914 nm, 1064 nm, and 1341 nm. After frequency doubling, both of them can produce all red, green and blue light. The frequency-doubling fiber material can be lithium niobate ($LiNbO_3$) or lithium tantalite ($LiTaO_3$). They are made with a polarization alternating period during the manufacturing process. The semiconductor laser array can be composed of the semiconductor lasers with a wavelength of 808 nm or 885 nm that has higher conversion efficiency.

Figure 2:
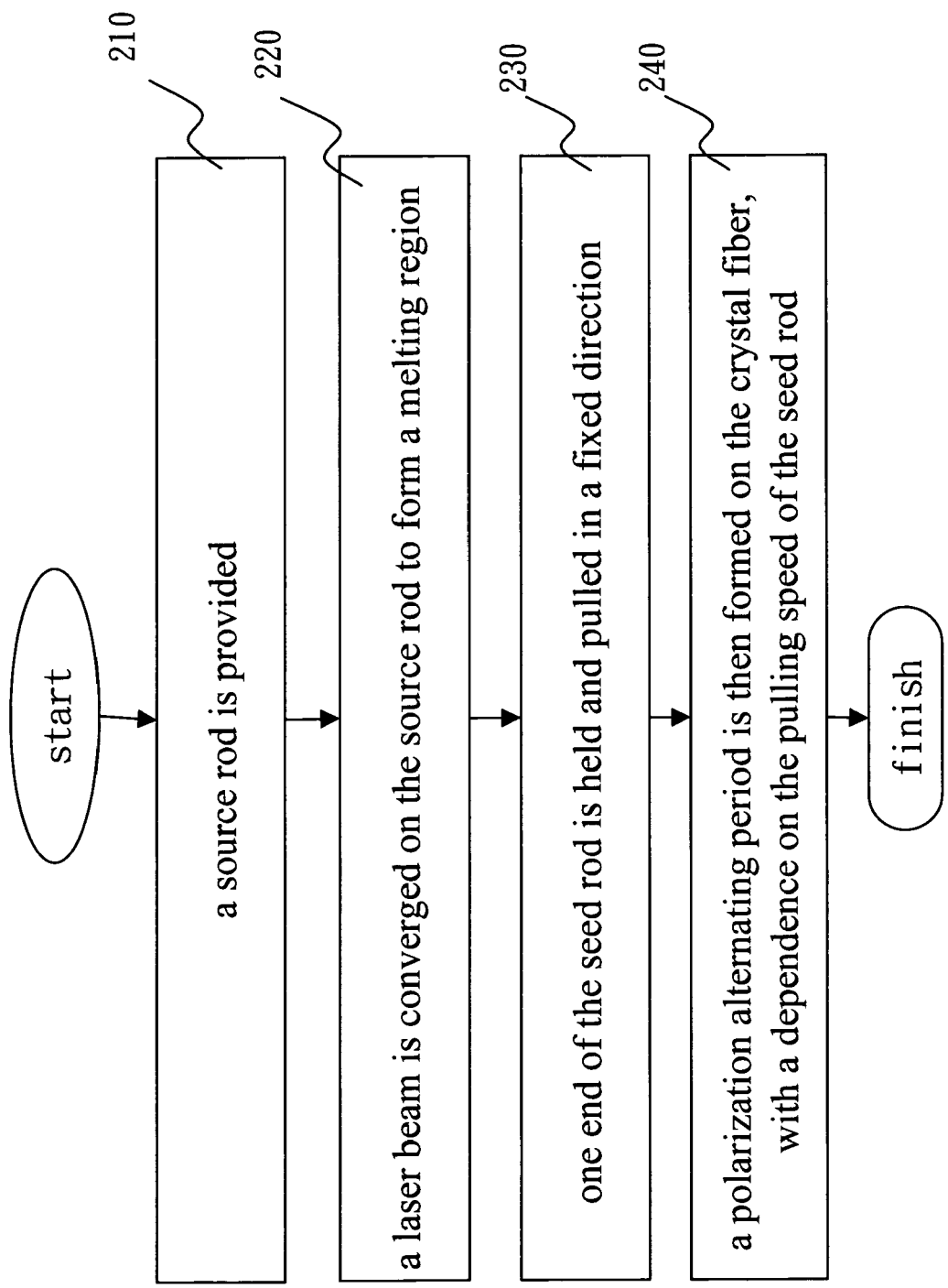
FIG. 2 is a flowchart of making the disclosed frequency-doubling crystal fiber.

In order to form a frequency-doubling crystal fiber with a polarization alternating period, the invention adopts the LHPG method to grow the crystal fiber. Not only can this method readily control the crystallization direction and diameter of the crystals, it further has a fast growth speed, low energy consumption, and easy control without the problem of pollution. As shown in FIG. 2, the LHPG method used to grow the crystal fiber includes the following steps. First, a source rod is provided (step 210) as the material of the crystal fiber. A laser beam is converged on the source rod to form a melting region (step 220). One end of the source rod is held and pulled in a fixed direction (step 230) to obtain a thin crystal fiber from the melting region. A pair of electrodes is provided on both sides of the crystal fiber. These electrodes continuously and periodically alternate their polarizations according to an imposed external field. A polarization alternating period is then formed on the crystal fiber, with a dependence on the pulling speed of the seed rod (step 240). By controlling the period T of the external electric field and the pulling speed Vc of the seed rod, one can determine the polarization alternating period $\Lambda$. They have the following relation:

$$\Lambda = 2l_c = \frac{\lambda}{2} \cdot \frac{1}{(n_{2w} - n_w)} = \frac{V_c T}{2}$$

here 1c, $n_{2w}$, and $n_w$ are the coherence length and the indices of refraction of the seed rod, $\lambda$ is the wavelength of the pumping light. The frequency-doubling crystal fiber formed from lithium niobate or lithium tantalate can combine with the gain crystal fiber of different materials to produce red, green, and blue light. Using Nd:YAG as the gain crystal fiber, the polarization alternating period can be 12.7 nm, 6.8 nm, and 4.7 nm. The 12.7-nm polarization alternating period can double the frequency of the base-frequency light with the wavelength 1319 nm to a red beam with the wavelength 659.5 nm. The 6.8-nm polarization alternating period can double the frequency of the base-frequency light with the wavelength 1064 nm to a green beam with the wavelength 532 nm. The 4.7-nm polarization alternating period can double the frequency of the base-frequency light with the wavelength 946 nm to a blue beam with the wavelength 473 nm. Using Nd:$YVO_4$ as the gain crystal fiber, the polarization alternating period can be 13.3 nm, 6.8 nm, and 4.1 nm. The 13.3-nm polarization alternating period can double the frequency of the base-frequency light with the wavelength 1341 nm to a red beam with the wavelength 670.5 nm. The 6.8-nm polarization alternating period can double the frequency of the base-frequency light with the wavelength 1064 nm to a green beam with the wavelength 532 nm. The 4.1-nm polarization alternating period can double the frequency of the base-frequency light with the wavelength 914 nm to a blue beam with the wavelength 457 nm.

Furthermore, the gain crystal fiber or frequency-doubling crystal fiber can be tapped, polished, and coated to form the required crystal fiber. The gain crystal fiber can be coated with optical films on both ends to form a fiber laser. It can be combined with the frequency-doubling crystal fiber before coating to form an intracavity frequency-doubling fiber laser. The gain crystal fiber and the frequency-doubling crystal fiber used in the micro crystal fiber laser have to be combined, using a mechanical, melting, or high-temperature diffusion means. The indices of refraction of the gain crystal fiber and the frequency-doubling crystal fiber are different. Their diameters need to be adjusted in order to reach mode matching. That is, their normalized frequencies V have to be same. Their radii have to satisfy the following relation:

$$V = \frac{2\pi r}{\lambda} \cdot (n_2 - n_1)^{1/2}$$

where r is the radius of the crystal fiber, $n_2$ is the index of refraction of the crystal fiber, $n_1$ is the index of refraction of the air, and $\lambda$ is the wavelength of the propagating beam.

The disclosed production method makes use of a converging laser beam as the heat source to generate an extremely high temperature gradient. As a result, the growth speed is very fast. A crystal fiber with a diameter smaller than 10 micrometers can even be grown. Therefore, the volume of the whole module can be reduced. Moreover, using the crystal fiber as the gain medium can speed up heat dissipation.

Certain variations would be apparent to those skilled in the art, which variations are considered within the spirit and scope of the claimed invention.

What is claimed is:

1. A micro crystal fiber laser, comprising:
   a semiconductor laser, which provides simulated beam;
   a gain crystal fiber, which receives the stimulated beam and generates base-frequency beam; and
   a frequency-doubling crystal fiber, which is directly connected to the gain crystal fiber and has a polarization alternating period formed in the frequency-doubling crystal fiber to double the frequency of the base-frequency beam to a double-frequency beam with a desired wavelength.

2. The micro crystal fiber laser of claim 1, wherein the gain crystal fiber comprises a gain medium and a plurality of optical films coated on both ends of the gain medium.

3. The micro crystal fiber laser of claim 1, further comprising: a plurality of optical films coated on both ends of combination of the gain crystal fiber and the frequency-doubling crystal fiber.

4. The micro crystal fiber laser of claim 1. wherein the material of the gain crystal fiber is selected from the group consisting of Nd:YAG and Nd:YVO$_4$.

5. The micro crystal fiber laser of claim 1, wherein the material of the frequency-doubling crystal fiber is selected from the group consisting of lithium niobate and lithium tantalate.

6. The micro crystal fiber laser of claim 1, wherein the wavelength of the semiconductor laser is one of 808 nm and 885 nm.

7. A micro crystal fiber laser, comprising:
a plurality of semiconductor lasers, each of which provides a stimulated beam;
a plurality of gain crystal fibers, which respectively receive the stimulated beams and respectively generate a plurality of base-frequency beams; and
a plurality of frequency-doubling crystal fibers, coupled to the gain crystal fibers respectively, each of the frequency-doubling crystal fibers having a polarization alternating period to double the frequency of the corresponding base-frequency beam to a double-frequency beam with a desired wavelength.

8. The micro crystal fiber laser of claim 7, further comprising: a plurality of optical films coated on both ends of each of the gain crystal fibers.

9. The micro crystal fiber laser of claim 7, further comprising: a plurality of optical films coated on both ends of each of the gain crystal fibers which is combined with the coupled frequency-doubling crystal fiber.

10. The micro crystal fiber laser of claim 7, wherein the material of the gain crystal fiber is selected from the group consisting of Nd:YAG and Nd:YVO4.

11. The micro crystal fiber laser of claim 7, wherein the material of the frequency-doubling crystal fiber is selected from the group consisting of lithium niobate and lithium tantalate.

12. The micro crystal fiber laser of claim 7, wherein the wavelength of the semiconductor laser is selected from one of 808 nm and 885 nm.

13. The micro crystal fiber laser of claim 7, wherein the gain crystal fiber is combined with the coupled frequency-doubling crystal fiber.

14. The micro crystal fiber of claim 7, wherein the double-frequency beams include red, green, and blue light.

15. The micro crystal fiber laser of claim 1, wherein normalized frequencies of the gain crystal fiber and the frequency-doubling crystal fiber are the same.

16. The micro crystal fiber laser of claim 7, wherein normalized frequencies of the gain crystal fiber and the frequency-doubling crystal fiber coupled to each other are the same.

17. The micro crystal fiber laser of claim 7, wherein the frequency-doubling crystal fibers have different polarization alternating periods.

18. The micro crystal fiber laser of claim 7, wherein the number of the semiconductor lasers, the gain crystal fibers and the frequency-doubling crystal fibers is the same.

19. The micro crystal fiber laser of claim 7, wherein all of the semiconductor lasers provide the stimulated beams with the same wavelength.

20. The micro crystal fiber laser of claim 1, wherein the gain crystal fiber has a gain medium being a fiber-shape, one end of the gain medium facing the semiconductor laser, the frequency-doubling crystal fiber is directly connected to one end of the gain crystal fiber opposite to the semiconductor laser, and the frequency-doubling crystal fiber has the polarization alternating period.

21. The micro crystal fiber laser of claim 20, wherein the gain crystal fiber comprises a plurality of optical films coated on both ends of the gain medium, one of the both ends of the gain medium faces the semiconductor laser, and the other of the both ends of the gain medium is opposite to the semiconductor laser.

22. The micro crystal fiber laser of claim 21, further comprising:
a plurality of optical films coated on both ends of combination of the gain crystal fiber and the frequency-doubling crystal fiber, one of the both ends of the combination with the optical films faces the semiconductor laser, and the other of the both ends of the combination with the optical films is opposite to the semiconductor laser.

23. A micro crystal fiber laser, comprising:
a semiconductor laser array, having a plurality of semiconductor lasers, each of the semiconductor lasers used to provide a stimulated beam;
a fixing base;
a plurality of gain crystal fibers, disposed on the fixing base corresponding to the semiconductor lasers one-to-one, each of the gain crystal fibers used to receive the stimulated beam from the corresponding the semiconductor laser to generate a base-frequency beam; and
a plurality of frequency-doubling crystal fibers, directly connected to the gain crystal fibers one-to-one, each of the frequency-doubling crystal fibers having a polarization alternating period and used to double the base-frequency beam from the connected gain crystal fiber to form a double-frequency beam.

* * * * *